US008935720B1

(12) United States Patent
Bertz et al.

(10) Patent No.: US 8,935,720 B1
(45) Date of Patent: Jan. 13, 2015

(54) MULTIMEDIA AD DELIVERY

(75) Inventors: Lyle T. Bertz, Lees Summit, MO (US); Yaojun Sun, South Riding, VA (US); Christopher J. Mateski, Overland Park, KS (US); Chuma U. Agogbua, Herndon, VA (US)

(73) Assignee: Sprint Communications Company L. P., Overland Park, KS (US)

( * ) Notice: Subject to any disclaimer, the term of this patent is extended or adjusted under 35 U.S.C. 154(b) by 1479 days.

(21) Appl. No.: 12/171,484

(22) Filed: Jul. 11, 2008

Related U.S. Application Data

(63) Continuation-in-part of application No. 12/052,281, filed on Mar. 20, 2008.

(51) Int. Cl.
*H04N 7/10* (2006.01)
*H04N 7/025* (2006.01)

(52) U.S. Cl.
USPC ............... 725/34; 725/35; 725/36; 725/93; 725/116; 725/146

(58) Field of Classification Search
USPC ............ 725/9, 32, 34–36, 93, 116, 146
See application file for complete search history.

(56) References Cited

U.S. PATENT DOCUMENTS

| | | | | |
|---|---|---|---|---|
| 5,283,639 | A * | 2/1994 | Esch et al. | 725/32 |
| 6,487,721 | B1 * | 11/2002 | Safadi | 725/36 |
| 6,760,916 | B2 | 7/2004 | Holtz et al. | |
| 6,771,644 | B1 | 8/2004 | Brassil et al. | |
| 7,203,758 | B2 | 4/2007 | Cook et al. | |
| 2002/0007393 | A1 * | 1/2002 | Hamel | 709/203 |
| 2002/0042914 | A1 * | 4/2002 | Walker et al. | 725/36 |
| 2002/0067730 | A1 | 6/2002 | Hinderks et al. | |
| 2002/0144262 | A1 * | 10/2002 | Plotnick et al. | 725/32 |
| 2004/0194130 | A1 * | 9/2004 | Konig et al. | 725/32 |
| 2004/0244035 | A1 * | 12/2004 | Wright et al. | 725/32 |
| 2005/0039205 | A1 * | 2/2005 | Riedl | 725/32 |
| 2006/0075449 | A1 * | 4/2006 | Jagadeesan et al. | 725/113 |
| 2006/0253864 | A1 * | 11/2006 | Easty | 725/35 |
| 2007/0055983 | A1 * | 3/2007 | Schiller et al. | 725/32 |
| 2007/0055984 | A1 * | 3/2007 | Schiller et al. | 725/32 |
| 2007/0055985 | A1 * | 3/2007 | Schiller et al. | 725/34 |
| 2007/0204292 | A1 * | 8/2007 | Riedl et al. | 725/34 |
| 2008/0040743 | A1 * | 2/2008 | Dharmaji | 725/35 |
| 2009/0037947 | A1 * | 2/2009 | Patil | 725/32 |
| 2009/0094634 | A1 * | 4/2009 | Haberman et al. | 725/32 |
| 2009/0106792 | A1 * | 4/2009 | Kan et al. | 725/34 |

OTHER PUBLICATIONS

Cisco Systems Inc., USA, "RTP/UDP/MPEG2 TS as a means of transmission for IPTV Streams", 1st FG IPTV meeting, Geneva, Switzerland, Jul. 10-14, 2006.
Brassil et al., "Enhancing Internet Streaming Media with Cueing Protocols", INFOCOM 2001 Twentieth Annual Joint Conference of the IEEE Computer and Communications Societies Proceedings. IEEE vol. 1, Issue , 2001.

(Continued)

*Primary Examiner* — Jason Salce

(57) ABSTRACT

Embodiments of the present invention provide systems, methods, and apparatuses for delivering an advertiser's ad content to a user regardless of the channel or media format being accessed by the user. Ads may be delivered within the media stream, in an ancillary stream, or from other sources.

10 Claims, 7 Drawing Sheets

(56) References Cited

OTHER PUBLICATIONS

Digital Program Insertion Splicing API, Society of Cable Telecommunications Engineers, Engineering Committee, Digital Video Subcommittee, www.scte.org/documents/standards/approved/SCTE302006.pdf.

Digital Program Insertion Cueing, Society of Cable Telecommunications Engineers, Engineering Committee, Digital Video Subcommittee, www.scte.org/documents/pdf/ANSISCTE352004.pdf.

Non-Final Office Action mailed Feb. 1, 2011 in U.S. Appl. No. 12/052,281.

\* cited by examiner

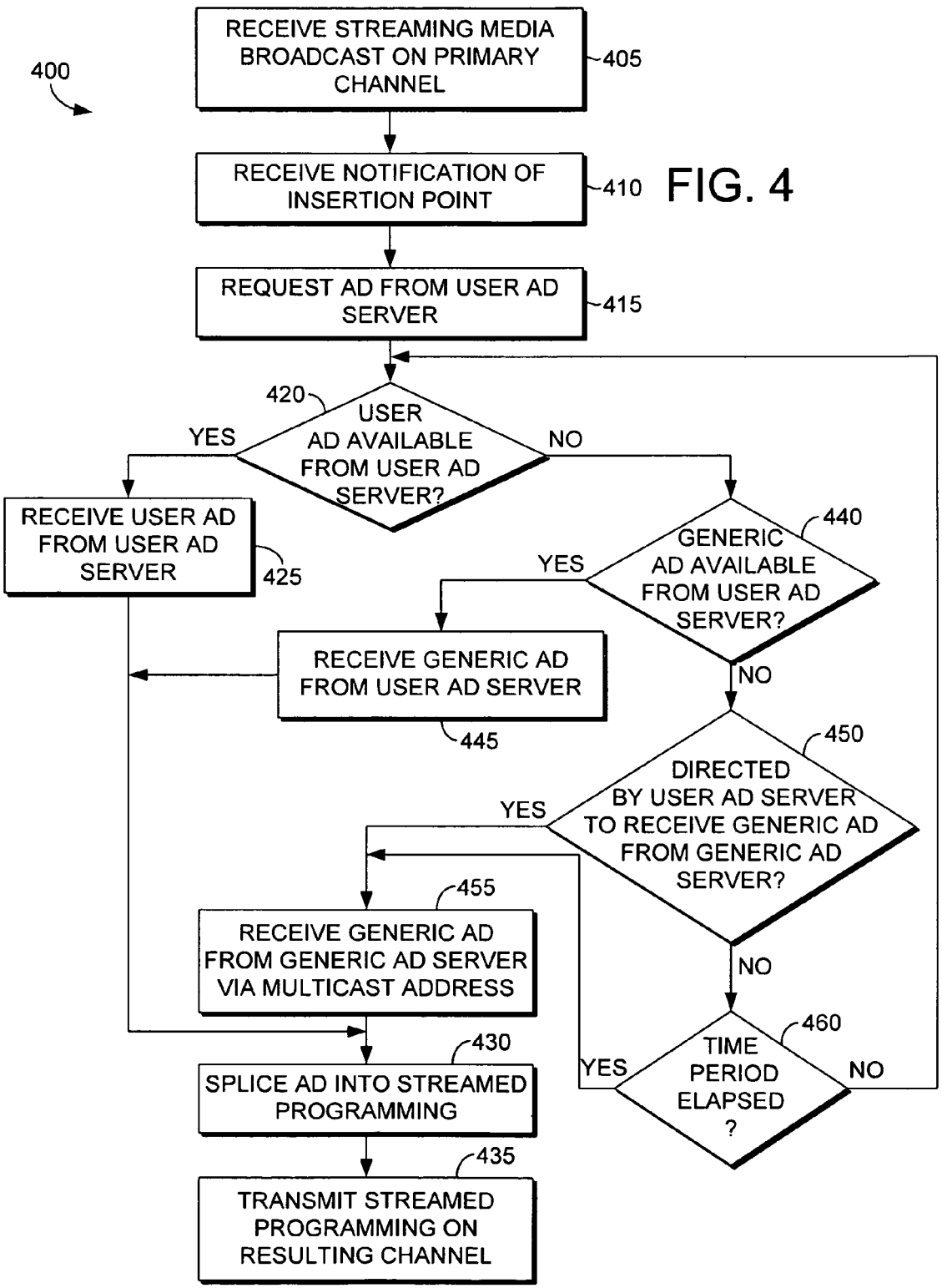

MULTIMEDIA AD DELIVERY

CROSS-REFERENCE TO RELATED APPLICATIONS

The present application is a continuation-in-part of U.S. patent application Ser. No. 12/052,281 filed Mar. 20, 2008, which is incorporated herein by reference.

BACKGROUND

This invention relates generally to the insertion of ads into streaming media.

SUMMARY

The present invention is defined by the claims below. Embodiments of the present invention provide a system and apparatus for, among other things, inserting user-targeted ads into streaming media and ensuring that there is no dead air time if a user-targeted ad is not available. It is desirable to select ads that are targeted to a specific user based on criteria about the user or other means. The issue arises of what should be done if a user-targeted ad is not available when it is needed, because Service Level Agreements typically require that no more than three seconds elapse from the beginning of an ad insertion point to the time the ad is delivered to the user. The present invention uses multiple ad servers to provide both user-targeted ads and generic ads, and uses a splicer to insert ads from the multiple ad servers into streaming media. Because the response time of a typical ad server can be as great as two seconds, that leaves only one second to procure and splice another ad if a user-targeted ad is not available. The present invention meets this timing constraint and ensures that the requirements of the Service Level Agreement are met.

Embodiments of the present invention also provide systems, methods, and apparatuses for, among other things, delivering an advertiser's ad content to a user of streaming media regardless of the channel or media format being accessed by the user. It is desirable to deliver ads within the media stream, in ancillary streams, or from other sources in a variety of formats such as video, audio, and rich media. Embodiments of the present invention use multiple ad servers and a splicer to provide ads in various formats and from multiple sources.

In an embodiment, a splicer receives streaming media and transmits the streaming media to a media player. The media content and media format of the streaming media may be selected by the user. The splicer is able to detect an ad cue in the streaming media, and in response requests an ad from a user ad server. The splicer receives the ad from the user ad server, a multimedia ad server, or other source. The ad has a format that is selected to be compatible with the content and/or format of the streaming media. The splicer transmits the ad to the user.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4 is a flowchart illustrative of an embodiment of user-targeted ad insertion in streaming media;

DETAILED DESCRIPTION

Figure 1:
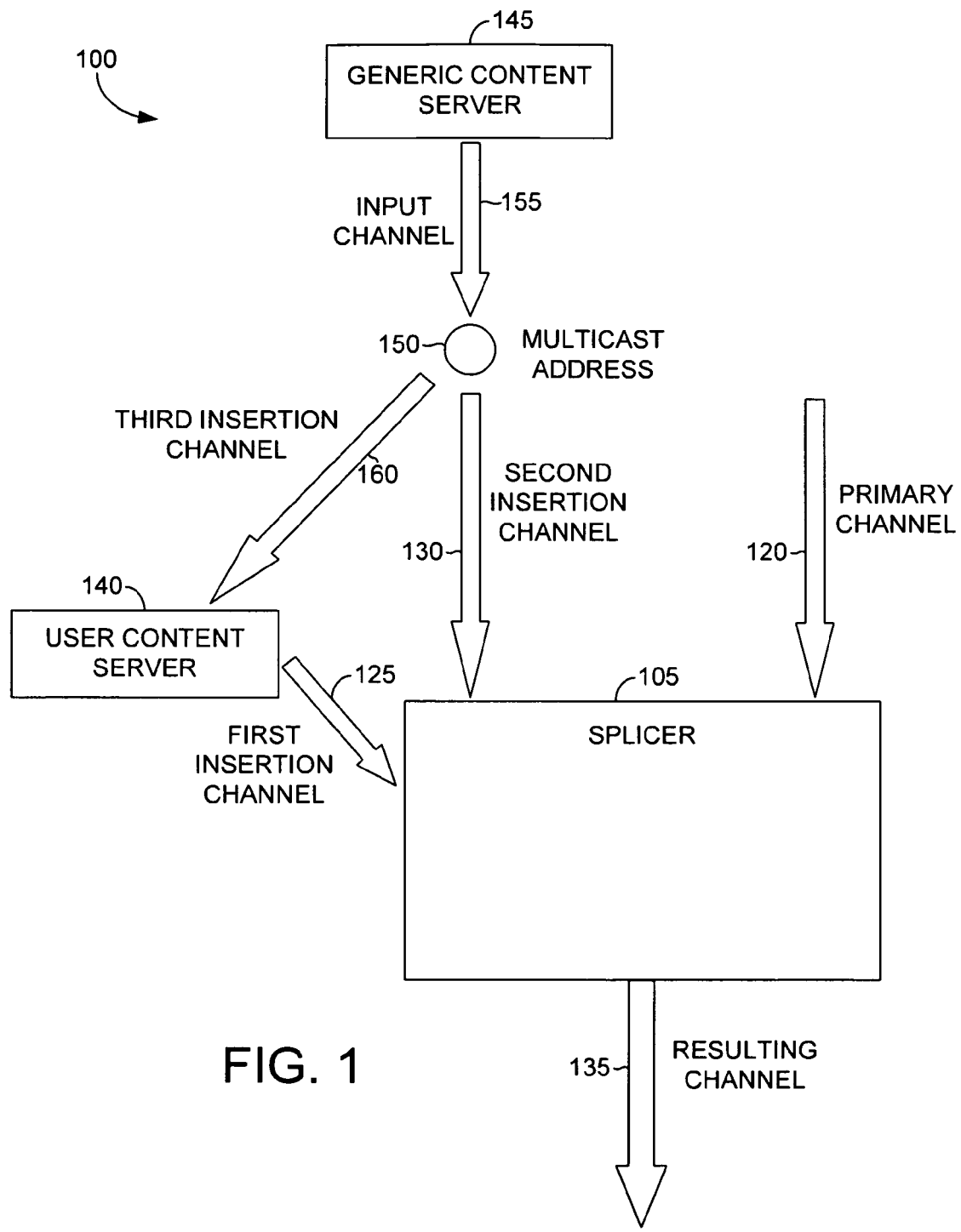
FIG. 1 is a block diagram of an exemplary system suitable for use in implementing embodiments of the present invention.

Embodiments of the present invention provide systems, methods, and apparatuses for user-targeted ad insertion in streaming media and delivering ads, in multiple formats, to a user of streaming media regardless of the channel, programming, or media format being received by the user. This is analogous to digital programming insertion in cable television broadcasting, although the medium of Internet Protocol Television allows much greater variety and flexibility in the types of ads that may be delivered to a user. This is analogous to digital programming insertion in cable television broadcasting. A description of digital programming insertion may be found in specifications ANSI/SCTE 35 2004 Digital Program Insertion Cueing Message for Cable by the Society of Cable Telecommunications Engineers, Inc. of Exton, Pa. and ANSI/SCTE 30 2006 Digital Program Insertion Splicing API by the Society of Cable Telecommunications Engineers, Inc. of Exton, Pa., which are incorporated herein by reference.

ACRONYMS AND SHORTHAND NOTATIONS

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AJAX Asynchronous Javascript And XML
ANSI American National Standards Institute
CD-ROM Compact Disc read-only memory
CNN Cable News Network
DVD Digital Versatile Disc
EEPROM Electrically Erasable Programmable Read-Only Memory
IP Internet Protocol
IPTV Internet Protocol Television
MSNBC Microsoft National Broadcasting Company
RAM Random Access Memory
ROM Read Only Memory
SCTE Society of Cable Telecommunications Engineers
SLA Service Level Agreement
TCP/IP Transmission Control Protocol/Internet Protocol Further, various technical terms are used throughout this description. An illustrative resource that fleshes out various aspects of these terms can be found in Newton's Telecom Dictionary by H. Newton, $23^{nd}$ Edition (2007).

As one skilled in the art will appreciate, embodiments of the present invention may be embodied as, among other things: a method, system, or computer-program product. Accordingly, the embodiments may take the form of at least a hardware embodiment or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The particular embodiments herein are intended in all respects to be illustrative rather than restrictive. Alternative embodiments will become apparent to those skilled in the art to which the present invention pertains without departing from its scope.

Referring to the drawings in general, and initially to FIG. 1 in particular, an exemplary system suitable for use in implementing embodiments of a user-targeted ad insertion in streaming media is shown and designated generally as ad insertion system 100. Ad insertion system 100 is but one example of a suitable ad insertion system and is not intended to suggest any limitation as to scope of use or functionality. Neither should the ad insertion system 100 be interpreted as having any dependency or requirement relating to any one or combination of components or modules illustrated.

It is desirable in Internet Protocol Television (IPTV) broadcasting to target ads to specific users. A targeted ad contains user content, i.e., content that is selected as pertaining to a specific user. A non-targeted ad, or generic ad, contains generic content that is not intended to be specific to a user. Targeting ads to a user may be accomplished by collecting data about the user and selecting user content based on the data. The user content is inserted into an IPTV broadcast at designated insertion points, which are indicated by some type of cue associated with the broadcast. However, the issue arises of what should be done if user content is not available. This situation might occur in the case of a new user, where little or no data has yet been collected. Or, the source of user content may become unavailable for some reason. A typical Service Level Agreement (SLA) for television broadcasts requires an ad to be inserted within three seconds of the insertion point. In the event that user content is not available, it is important to ensure that any existing SLA requirements are met, as well as any other restrictions on dead air time.

Ad insertion system 100 is an exemplary system for inserting user content into streaming media and ensuring that there is no dead air time in the event that the user content is unavailable. With continued reference to FIG. 1, ad insertion system 100 comprises a splicer 105 having three input channels: a primary channel 120, a first insertion channel 125, and a second insertion channel 130. The primary channel 120 carries streaming media in Internet Protocol (IP) format. The first insertion channel 125 carries the user content to be spliced (i.e., inserted) into the streaming media. The second insertion channel 130 carries generic content to be spliced into the streaming media. Additionally, the splicer 105 has a resulting channel 135 output that carries streaming programming with the user content and/or generic content spliced into it. The streaming programming is transmitted through the resulting channel 135 to a user. Channels 120, 125, 130 and 135 may include, but are not limited to, TCP/IP channels.

System 100 further comprises a user content server 140, which transmits the user content over the first insertion channel 125 to the splicer 105. Additionally, a generic content server 145 transmits generic content to a multicast address 150 over an input channel 155. From the multicast address 150, the generic content is transmitted over the second insertion channel 130 to the splicer 105 and over a third insertion channel 160 to the user content server 140. Channels 155 and 160 may include, but are not limited to, TCP/IP channels.

In one embodiment, the splicer 105 receives user content from the user content server 140 for insertion into the streaming media. Exemplary user content may include, but is not limited to, ads that are targeted to a specific user based on criteria about the user. An exemplary user content server 140 may include, but is not limited to, a single server or a collection of servers or other devices working together to supply user content to the splicer 105.

For various reasons, the user content server 140 may not have user content available for a particular user. This may occur, but is not limited to, because the user is new and the criteria for that user does not yet exist. Alternatively, the user may not fit into the demographic for which the streamed media is intended. In the event that user content does not exist for the user, the user content server 140 may join the multicast address 150 and receive the generic content from the multicast address 150 via the third insertion channel 160. Exemplary generic content may include, but is not limited to, a generic ad that is not targeted to the user. The user content server 140 may then transmit the generic content to the splicer 105 via the first insertion channel 125. Alternatively, the user content server 140 may direct the splicer 105 to join the multicast address 150 and receive the generic content directly from the multicast address 150 via the second insertion channel 130.

In the event that the user content server 140 does not respond to the splicer 105 request for user content within a certain time period, the splicer 105 will join the multicast address 150 and receive the generic content directly from the multicast address 150. In one embodiment, the time period is determined such that the time elapsed from the beginning of the insertion point to when the user content is delivered to the user does not exceed any relevant SLA or other restrictions on dead air time.

Figure 2:
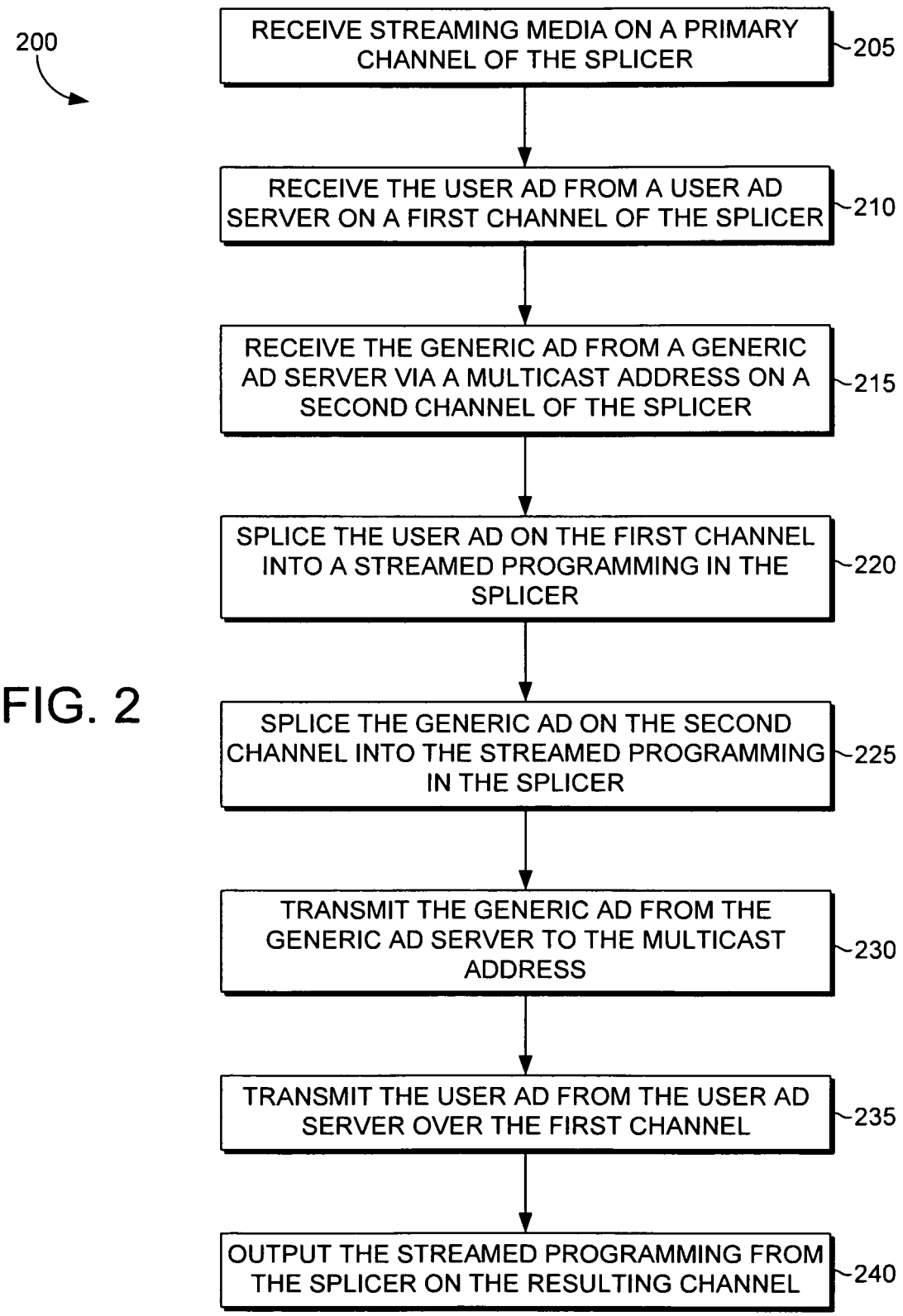
FIG. 2 is a flowchart illustrative of an operation of the exemplary system.

Turning now to FIG. 2, an exemplary operation of the ad insertion system 100 is depicted, designated generally as insertion system operation 200. The insertion system operation 200 is but one example of a suitable insertion system operation and is not intended to suggest any limitation as to scope of use or functionality. Neither should the insertion system operation 200 be interpreted as having any dependency or requirement relating to any one or combination of components or modules illustrated.

Referring to FIG. 1 and FIG. 2, a splicer 105 receives streaming media on a primary channel 120 at step 205. Exemplary streaming media may include, but are not limited to, broadcast television. This is the broadcast into which ads will be inserted. At step 210, a user ad from a user ad server (140) is received on a first channel (120) of the splicer 105. In the event that a user ad is unavailable on the first channel, a generic ad is received from a generic ad server (145) on a second channel (130) of the splicer 105 at step 215. The user ad is spliced into the streamed programming in the splicer 105 at step 220 or, if a generic ad was received instead, the generic ad is spliced into the streamed programming in the splicer 105 at step 225.

The generic ad, which is received on the second channel of the splicer 105, is transmitted from the generic ad server to a multicast address 150 at step 230. The splicer 105 receives the generic ad by joining the multicast address 150 through the second channel at step 215. The user ad, which is received on the first channel of the splicer 105 at step 210, is transmitted from the user ad server over the first channel at step 235.

The streamed programming with the ad inserted into it is transmitted by the splicer 105 to the user over the resulting channel 135 at step 240.

Figure 3A:
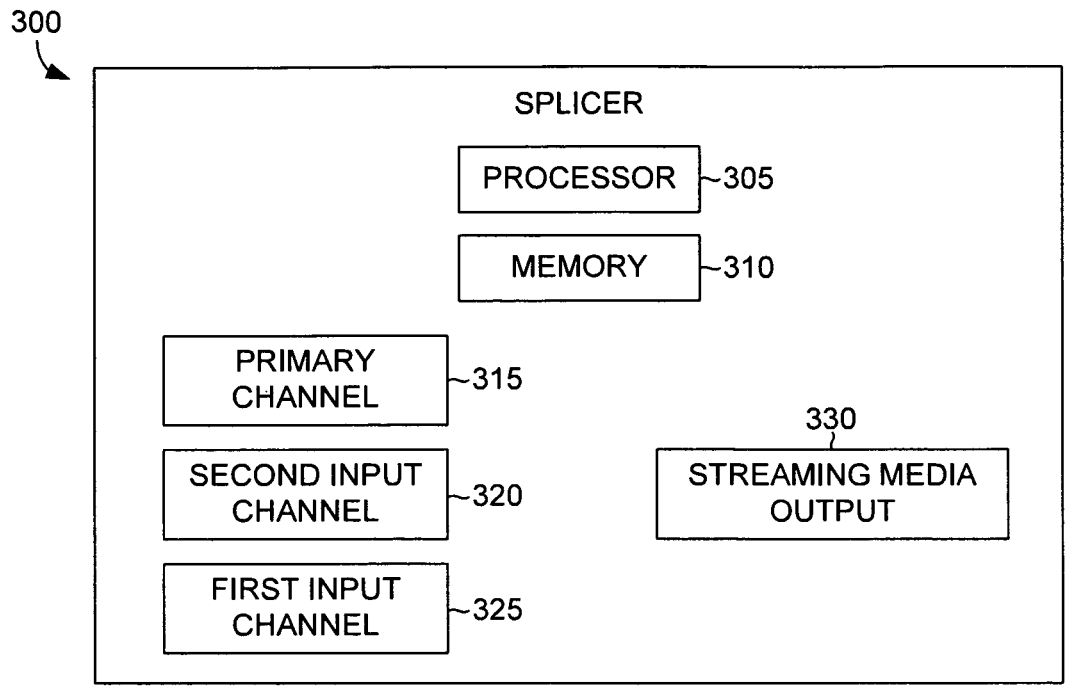
FIG. 3A is a block diagram illustrative of an exemplary splicer used in an implementation of an embodiment of the present invention.
Figure 3B:
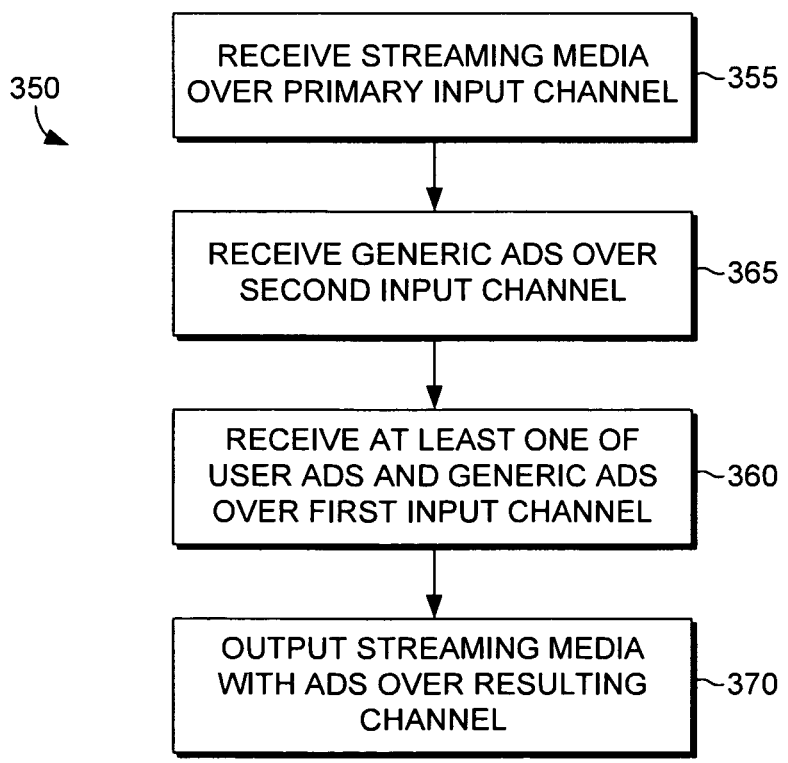
FIG. 3B is a flowchart illustrative of an operation of the exemplary splicer in FIG. 3A.

Turning now to FIG. 3A, an exemplary apparatus for a user-targeted ad insertion in streaming media is depicted, designated generally as splicer 300. By way of background, a splicer is a device for inserting programming or ads into broadcast programming such as in cable television. The splicer typically is used by a broadcast affiliate to insert local ads or programming into regionally broadcast programming. The broadcast programming is received on a primary channel of the splicer, and ads or other programming to be inserted are received on an insertion channel. An upcoming insertion point in the broadcast programming is indicated to the splicer by some means, such as a cue embedded in the broadcast programming. The splicer requests an ad from an ad server, which then sends the ad to the splicer over the insertion channel. The ad is inserted by the splicer into the media stream at the insertion point. Splicer operation for broadcast cable programming is more fully addressed in the aforementioned references ANSI/SCTE 35 2004 and ANSI/SCTE 30 2006. Referring to FIG. 3A, the splicer 300 is but one example of a suitable splicer and is not intended to suggest any limitation as to scope of use or functionality. Neither should the splicer 300 be interpreted as having any dependency or requirement relating to any one or combination of components or modules illustrated. Referring also to FIG. 3B, designated generally as splicer operation 350, an exemplary operation of splicer 300 is depicted. The splicer operation 350 is but one example of a suitable splicer operation and is not intended to suggest any limitation as to scope of use or functionality. Neither should the splicer operation 350 be interpreted as having any dependency or requirement relating to any one or combination of components/modules illustrated.

With continued reference to FIG. 3A and FIG. 3B, the splicer 300 includes a processor module 305, a memory module 310, a primary channel module 315, a second input channel module 320, a first input channel module 325, and a streaming media output module 330. The primary input channel module 315 receives a streaming media broadcast, at step 355, into which ads are to be spliced. Typically, there will be a signal or cue associated with the broadcast indicating an insertion point, which is the point at which an ad is to be inserted. With streaming media broadcasts, technology allows ads to be targeted to a specific user, meaning that the ad content is selected specifically for a user based on information or criteria about the user. At step 360, the first input channel module 325 receives the user-targeted ad if available. If a user-targeted ad is not available, the first input channel module 325 may receive a generic ad at step 360. In one embodiment the user ads are received from a user ad server. When inserting user-targeted ads from a user ad server a timing issue can arise. SLAs in broadcast television require an ad to be inserted within three seconds of the insertion point. Receiving an ad from a user ad server may take up to two seconds. If an ad is not available, a backup ad must be received from another source. However, another two second delay is unacceptable as this would exceed the three second requirement. A solution is to receive an ad from another server via a multicast address, with a preferred time of one second at most. The second input channel module 320 receives generic ads (which are not user-targeted) at step 365. In one embodiment, the generic ads are received from a generic ad server via a multicast address. If a user-targeted ad and a generic ad are not available at the first input channel module 325, then the generic ad received at the second input channel module 320 is inserted, or spliced, into the streaming media. The resultant streaming media with the inserted ad is transmitted to the user by the streaming media output module 330 at step 370.

Referring now to FIG. 4, a flow chart depicts an exemplary preferred embodiment for a user-targeted ad insertion in streaming media, designated generally as ad insertion 400. The ad insertion 400 is but one example of a suitable ad insertion and is not intended to suggest any limitation as to scope of use or functionality. Neither should the ad insertion 400 be interpreted as having any dependency or requirement relating to any one or combination of components or modules illustrated.

Ad insertion 400 is an embodiment for inserting a user ad into streaming media and ensuring that there is no dead air time in the event that the user ad is unavailable. As discussed above, a user ad is targeted or selected for a specific user based on criteria about the user, whereas a generic ad is not targeted or selected for a specific user. Beginning at step 405, streaming media is received on a primary channel 120 of a splicer 105. The splicer 105 receives notification of an insertion point at step 410. An insertion point is a point at which an ad should be inserted into the streaming media. The splicer 105, at step 415, requests an ad from a user ad server (140). The user ad server, which in one embodiment may be a single device or a collection of devices, has access to user ads and selects an appropriate user ad to provide to the splicer 105. At step 420, if a user ad is available from the user ad server, then the splicer 105 receives the user ad from the user ad server at step 425. The user ad is spliced into the streamed programming by the splicer 105 at step 430, and the streamed programming with the inserted user ad is transmitted by the splicer 105 on a resulting channel 135 at step 435.

At step 420, if a user ad is unavailable from the user ad server, then at step 440, if a generic ad is available from the user ad server, the splicer 105 receives the generic ad from the user ad server at step 445. In one embodiment, the user ad server may receive a generic ad from a generic ad server (145) by joining a multicast address 150 to which the generic ad server transmits generic ads. The generic ad received by the splicer 105 at step 445 is spliced into the streamed programming by the splicer 105 at step 430, and the streamed programming with the inserted generic ad is transmitted by the splicer 105 on the resulting channel at step 435.

At step 440, if a generic ad is unavailable from the user ad server, then at step 450, if the splicer 105 is directed by the user ad server to receive a generic ad from the generic ad server via the multicast address 150, then at step 455 the splicer 105 receives a generic ad from the generic ad server by joining the multicast address 150. The generic ad is spliced into the streamed programming by the splicer 105 at step 430, and the streamed programming with the inserted generic ad is transmitted by the splicer 105 on the resulting channel 135 at step 435.

At step 450, if the splicer 105 is not directed by the user ad server to receive a generic ad from the generic ad server, then at step 460, if a certain period of time has not elapsed, step 420 occurs again along with the previously described steps following it. At step 460, if a certain period of time has elapsed, then the splicer 105 receives a generic ad from the generic ad server by joining the multicast address 150 at step 455. The generic ad is spliced into the streamed programming by the splicer 105 at step 430, and the streamed programming with the inserted generic ad is transmitted by the splicer 105 on the resulting channel 135 at step 435.

Figure 5:
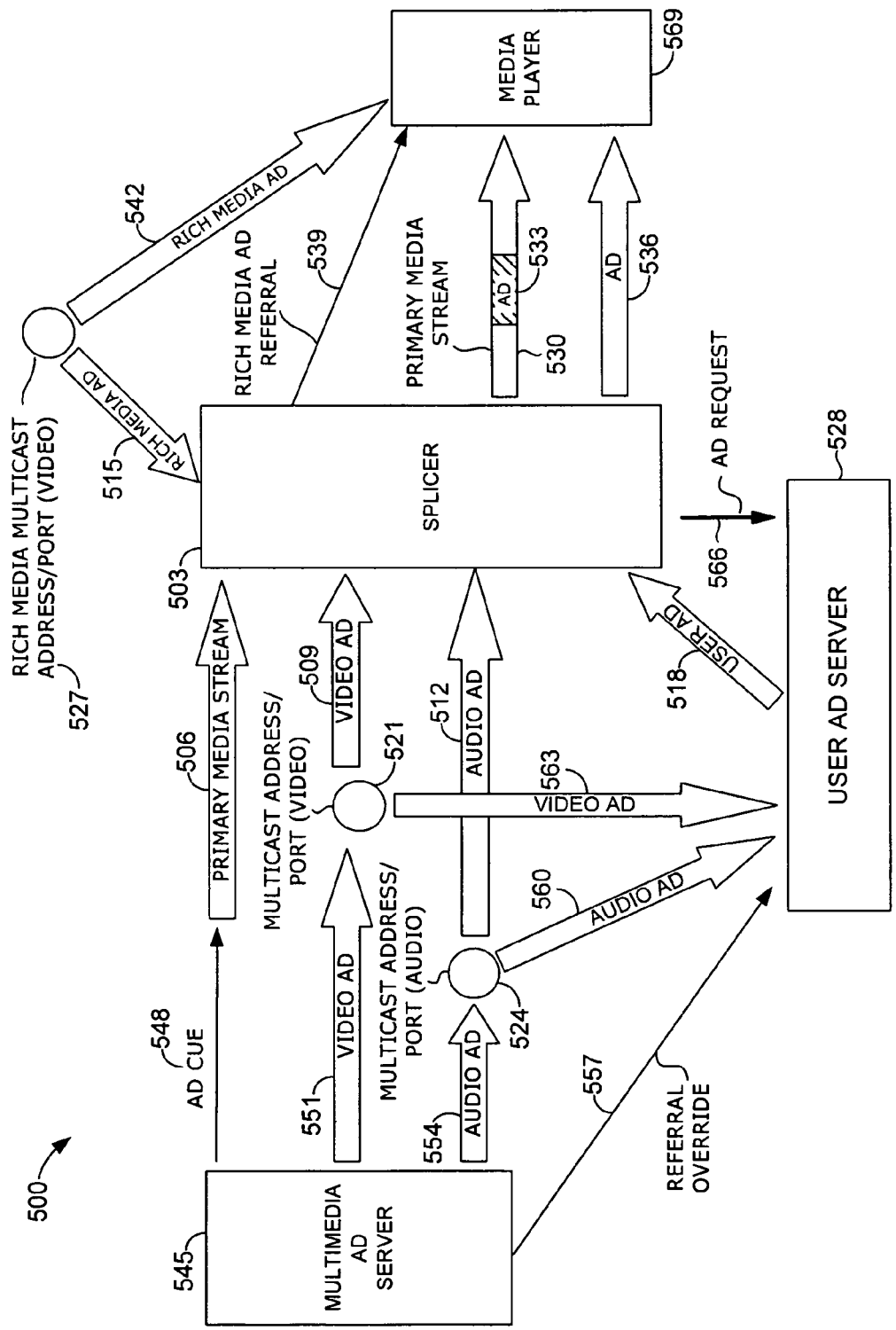
FIG. 5 is a block diagram of an exemplary system suitable for use in implementing embodiments of the present invention.

Referring to FIG. 5, an exemplary system suitable for use in implementing embodiments of a multimedia ad delivery system is shown and designated generally as multimedia ad delivery system 500. Multimedia ad delivery system 500 is but one example of a suitable multimedia ad delivery system and is not intended to suggest any limitation as to scope of use or functionality. Neither should the multimedia ad delivery system 500 be interpreted as having any dependency or requirement relating to any one or combination of components or modules illustrated.

It is desirable in Internet Protocol Television (IPTV) broadcasting to take advantage of the capabilities of the medium. In traditional broadcast media, advertisers often purchase simultaneous ad slots on multiple channels, so that a viewer or listener will receive the same ads, or ads with the same ad content, regardless of which channel or station is being received by the user. It is desirable to achieve the same effect in IPTV and other forms of Internet Protocol (IP) transmissions, such as Internet radio, while delivering and/or targeting ads to a user in a variety of formats that are unavailable in traditional broadcast media.

With continued reference to FIG. 5, multimedia ad delivery system 500 comprises a splicer 503 that can receive a primary media stream 506, a video ad 509, an audio ad 512, a rich media ad 515, and a user ad 518. The video ad 519 as shown is received from a multicast address 521, although the video ad 509 may also be received as unicast. The video ad 509 may be video only, or may include audio associated with the video. The audio ad 512 as shown is received from a multicast address 524, but it may also be received as unicast. Audio ad 512 may be an audio-only ad, as would be used in an audio program such as Internet radio. The rich media ad 515 may consist of a combination of formats, for example, animation, audio, video, banners, etc., and may respond to user interaction, as would be known to one skilled in the art. Rich media ad 515 as shown is received from a multicast address 527, but it may also be received as unicast. It may be also be received from the multimedia ad server 545 or other sources. The user ad 518 is received from a user ad server 528. An exemplary user ad 518 may be targeted to a specific user, based on criteria about the user, but is not limited to being targeted to a specific user.

The splicer 503 can transmit the primary media stream 530 with or without an ad 533 inserted into the stream. The splicer 503 can further transmit an ad 536 externally to primary media stream 530 and transmit a rich media ad referral 539 (also known as an ad referral). The rich media ad referral 539 (ad referral) is a mechanism or a set of instructions that directs the media player 569 to receive a rich media ad 542 from an external address. The rich media ad 542 as shown is received from the multicast address 527, but it may also be received as unicast. It may be also be received from the multimedia ad server 545 or other sources. The rich media ad 542 may also be pushed to the media player 569, if the media player 569 is capable of AJAX or other push technologies that are known to one skilled in the art.

Multimedia ad delivery system 500 further comprises a multimedia ad server 545 that can insert an ad cue 548 into the primary media stream 506, transmit a video ad 551 to the multicast address 521, transmit an audio ad 554 to the multicast address 524, and provide a referral override 557 to the user ad server 528. The referral override 557 will be discussed in more detail in reference to the user ad server 528. The video ad 551 may be video only, or may include audio associated with the video. The video ad 551 as shown is transmitted to the multicast address 521, but may also be transmitted as unicast. The audio ad 554, as shown, is transmitted to the multicast address 524, but may also be transmitted as unicast. The audio ad 554 may be an audio-only ad, as would be used in an audio program such as Internet radio.

Multimedia ad delivery system 500 further comprises the user ad server 528, which can receive an audio ad 560, a video ad 563, and the referral override 557. The audio ad 560 and the video ad 563 are shown as received from multicast addresses, but either or both may be received as unicast. The user ad server 528 can also transmit the user ad 518 in response to an ad request 566 from the splicer 503.

Multimedia ad delivery system 500 further comprises a media player 569 that can receive the primary media stream 530, the ad 536, the rich media referral 539, and the rich media ad 542. The media player is further able to deliver the ad to the user. Exemplary ways of delivering the ad to the user may include displaying a video with or without associated audio, playing an audio ad, and displaying a banner or other type of rich media.

Figure 6:
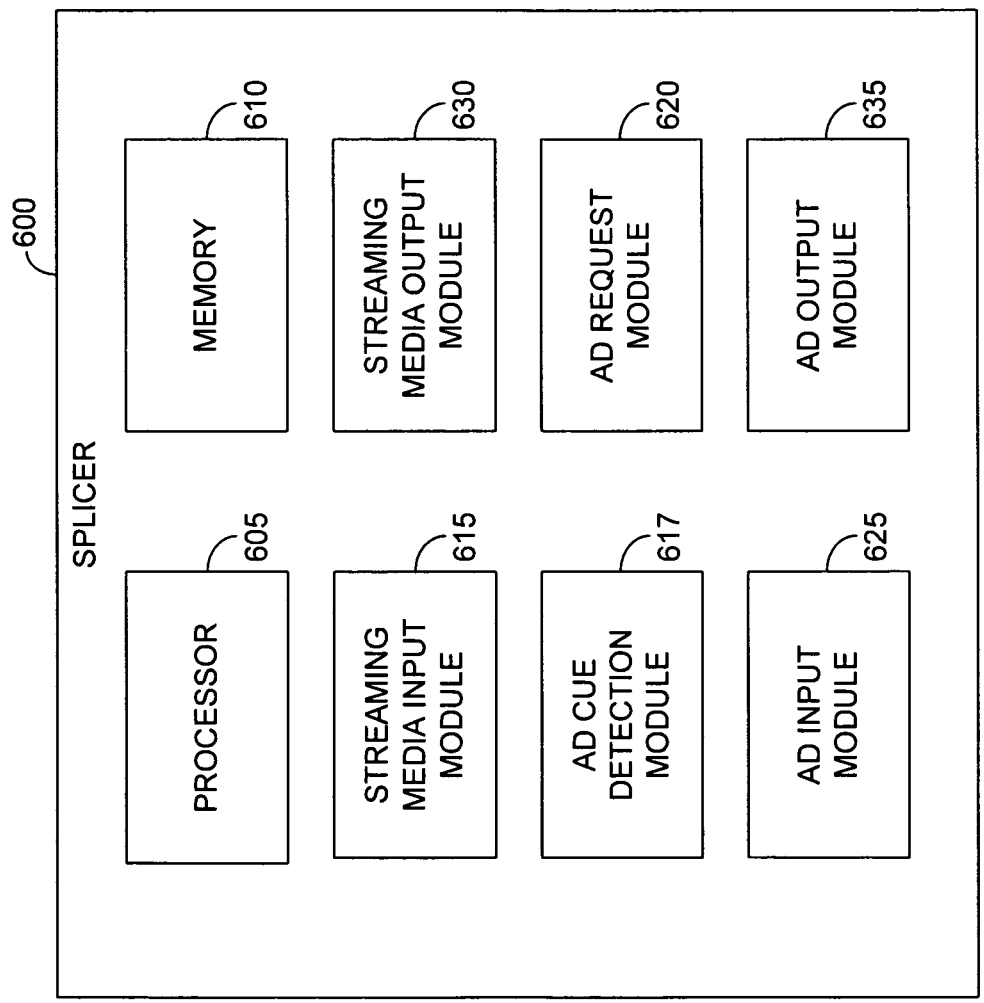
FIG. 6 is a block diagram illustrative of an exemplary splicer used in an implementation of an embodiment of the present invention.

Referring now to FIG. 6, a block diagram is depicted that is illustrative of an exemplary splicer used in an implementation of an embodiment of the present invention, and is generally referred to as splicer 600. The splicer 600 is but one example of a suitable splicer and is not intended to suggest any limitation as to scope of use or functionality. Neither should the splicer 600 be interpreted as having any dependency or requirement relating to any one or combination of components or modules illustrated.

With continued reference to FIG. 6, the splicer 600 includes: a processor module 605; a memory module 610; a streaming media input module 615 that receives streaming media that may contain an ad cue; an ad cue detection module 617 that detects an ad cue within the media stream; an ad request module 620 that sends a request for an ad, based on the ad cue, to the user ad server; an ad input module 625 that receives an ad from multicast or unicast sources; a streaming media output module 630 that transmits the received streaming media; and an ad output module 635 that transmits the ad in the streaming media, externally to the streaming media, or by transmitting an ad referral.

Figure 7:
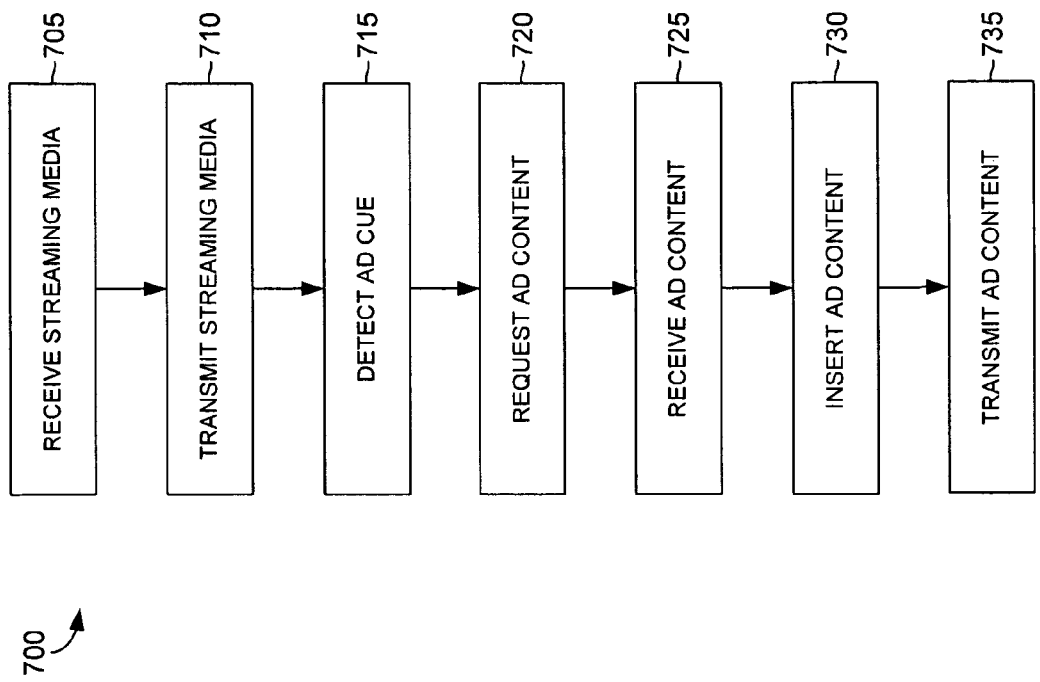
FIG. 7 is a flowchart illustrative of an exemplary method for implementing embodiments of the present invention.

FIG. 7 depicts a flowchart that is illustrative of an exemplary method for implementing embodiments of the present invention and is designated generally as multimedia ad delivery method 700. Multimedia ad delivery method 700 is but one example of a suitable multimedia ad delivery method and is not intended to suggest any limitation as to scope of use or functionality. Neither should the multimedia ad delivery method 700 be interpreted as having any dependency or requirement relating to any one or combination of components or modules illustrated.

In one embodiment, FIG. 7 is descriptive of an exemplary operation of the splicer 503 of FIG. 5 and the splicer 600 in FIG. 6. After a brief explanation of FIG. 7, the figure will be discussed in more detail in relation to FIG. 5 and FIG. 6. Continuing with FIG. 7, streaming media is received at a step 705. The streaming media is transmitted at a step 710. An ad cue is detected within the streaming media at a step 715. An ad is requested at a step 720. At a step 725, the ad is received. The ad is inserted into the streaming media at a step 730, and the ad is transmitted at a step 735.

FIG. 7 will now be discussed in the context of an exemplary embodiment of a multimedia ad delivery system, with reference to FIG. 5 and FIG. 6. For the convenience of the reader, the first digit of a reference number identifies the figure in which the reference is located, i.e., the splicer 503 is in FIG. 5, the ad cue detection module 617 is in FIG. 6, and the step 705 (receive streaming media) is in FIG. 7.

The multimedia ad server 545 inserts the ad cue 548 into the primary media stream 506. The ad cue 548 indicates a point at which an ad is to be delivered to the user. The type of ad to be delivered to the user depends at least in part on the media format being received by the user. The multimedia ad delivery system 500 can deliver an advertiser's ad content to the user regardless of the channel, program, or media format that is being accessed or selected by the user. In an exemplary situation, if the user switches from CNN to MS NBC, or to an Internet radio program, the user receives the same ad content from an advertiser on each channel, whatever the media format may be. An ad may be delivered to the user by inserting it into the stream, examples of which may include video ads and audio ads. An ad may be delivered to the user as side content, i.e., displayed elsewhere on a display screen rather than being embedded within a program or media stream. Exemplary side content would include banner ads and rich media ads.

At a step 705, the primary media stream is received by the streaming media input module 615 of the splicer 600, which in one embodiment corresponds to the splicer 503. At a step 710 the streaming media output module 630 of the splicer 503 (or splicer 600) transmits the primary media stream to the media player 569. The ad cue detection module 617 detects the ad cue 548 within the primary media stream 506 at a step 715. The ad request module 620 sends the ad request 566 to the user ad server 528 at a step 720. The user ad server 528 may select an ad stored within the user ad server 528 or retrieve an audio ad 560 from multicast address 524 or a video ad 563 from multicast address 521. Although not shown in FIG. 5, an ad may also be received by the user ad server 528 as unicast rather than multicast. The ad selected or received by the user ad server 528 is sent by the user ad server 528 to the splicer 503 as ad 518. The ad 518 is received by the ad input module 625 of the splicer 503 at a step 725.

In the event that the user ad server 528 receives the referral override 557 from the multimedia ad server 545, the user ad server 528 directs the splicer 503 to receive an ad from the multimedia ad server 545 instead of from the user ad server 528. In that case, at the step 725, the ad input module 625 of the splicer 503 receives the video ad 509 from the multicast address 521 or the audio ad 512 from the multicast address 524.

At a step 730, the ad output module 635 inserts the ad 533 into the primary media stream 530 if the ad cue 548 indicates that the ad is to be inserted. The ad 533 is then transmitted within the primary media stream at a step 735. Otherwise, the ad 536 is transmitted to the media player 569 outside of the primary media stream 530, at the step 735.

In addition to receiving an ad from the user ad server 528 or the multimedia ad server 545, the ad input module 625 of the splicer 503 may receive a rich media ad 515 from the multicast address 527 or other sources. The ad output module 635, at the step 735, may transmit the rich media ad to the media player 569 outside of the primary media stream 530. Further, the splicer 503 may send the rich media referral 539 to the media player, directing the media player to receive the rich media ad 542 from the multicast address 527 or other sources.

The media player 569 can receive: the primary media stream 530, which may contain the ad 533; the ad 536; the rich media referral 539; and the rich media ad 542. The media player 569 presents the content of the primary media stream 530 to the user. The content may include the ad 533 content as well as program content. The media player 569 may also present the ad 536 and the rich media ad 542 to the user outside of the content of the primary media stream. Exemplary ads may include, but are not limited to, video, audio, banner and rich media ads.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for delivering an ad to a user using multiple media formats, the system comprising:
   a multimedia ad server operable to
   (A) insert an ad cue into a primary media stream, and
   (B) transmit ads in at least one format to a splicer and a user ad server by way of a multicast transmission, wherein the ads are transmitted to the splicer and the user ad server for insertion into the primary media stream;
   the user ad server operable to
   (A) receive from the splicer a request for an ad,
   (B) retrieve stored ads,
   (C) receive ads from the multimedia ad server,
   (D) provide ads to the splicer, and
   (E) direct the splicer to receive the ad from the multimedia ad server, wherein the splicer receives the ad from the multimedia ad server when directed, and wherein otherwise the splicer receives the ad from the user ad server; and
   the splicer operable to
   (A) detect an ad cue in the primary media stream,
   (B) request the ad from the user ad server,
   (C) receive the ad in the at least one format from at least one of the multimedia ad server or the user ad server, and
   (D) transmit the ad or an ad referral to a media player.

2. The system of claim 1, wherein the at least one format is at least one of a video format, an audio format, and a rich media format.

3. The system of claim 2, further comprising the multimedia ad server operable to preempt the user ad server, whereby the user ad server directs the splicer to receive the ad from the multimedia ad server.

4. The system of claim 1, wherein the user ad server is further operable to, upon receiving the request for the ad, retrieve a stored ad and, when an appropriate stored ad is unavailable, receive the ad from the multimedia ad server.

5. The system of claim 1, wherein the user ad server is further operable to, upon receiving the request for the ad, retrieve a stored ad and, when an appropriate stored ad is unavailable, direct the splicer to receive the ad from the multimedia ad server.

6. A method for delivering an ad to a user of an Internet Protocol network, the method comprising:
- receiving at a first ad server a request to provide an ad to a splicer for insertion into a media stream that is transmitted to a media player associated with the user;
- determining whether a first ad is available within a storage;
- when the first ad is available within the storage, then retrieving the first ad and providing the first ad to the splicer; and
- when the first ad is not available within the storage, then providing a second ad to the splicer, wherein the second ad is multicast from a second ad server for insertion into the media stream that is transmitted to the media player associated with the user;
- wherein the ad is required to be provided to the splicer within a period of time such that the splicer is enabled to insert the ad into a media stream within a predetermined amount of time from when the ad cue was detected,
  - (A) wherein determining that the first ad is not available takes up a first amount of time,
  - (B) wherein providing the second ad to the splicer takes up a second amount of time, and
  - (C) wherein multicasting the second ad from the second ad server ensures that the second amount of time is an amount of time that, when combined with the first amount of time, enables the splicer to insert the ad within the predetermined amount of time.

7. The method of claim 6, wherein the first ad is a user-targeted ad.

8. The method of claim 7, wherein the second ad is a generic ad.

9. The method of claim 6, wherein providing the second ad to the splicer includes receiving the second ad via multicast from the second ad server and transmitting the ad to the splicer.

10. The method of claim 6, wherein providing the second ad to the splicer includes directing the splicer to receive the second ad via multicast from the second ad server.

* * * * *